(12) United States Patent
Heyman et al.

(10) Patent No.: US 6,780,932 B2
(45) Date of Patent: Aug. 24, 2004

(54) GRAFT POLYOLS PREPARED BY A CONTINUOUS PROCESS

(75) Inventors: Duane A. Heyman, Monroe, MI (US); Mao-Yao Huang, Riverview, MI (US)

(73) Assignee: BASF Corporation, Mt. Olive, NJ (US)

( * ) Notice: Subject to any disclaimer, the term of this patent is extended or adjusted under 35 U.S.C. 154(b) by 92 days.

(21) Appl. No.: 10/146,280

(22) Filed: May 15, 2002

(65) Prior Publication Data

US 2003/0181598 A1 Sep. 25, 2003

Related U.S. Application Data

(60) Provisional application No. 60/366,706, filed on Mar. 22, 2002.

(51) Int. Cl.[7] .................. C08F 16/06; C08F 283/06; C08F 291/08
(52) U.S. Cl. .................. 525/56; 525/59; 525/60; 525/62; 525/118; 525/162; 525/173; 525/263; 525/273; 525/332.9; 525/333.3; 525/532; 526/232.5
(58) Field of Search ............... 525/56, 59, 60, 525/62, 118, 162, 173, 263, 273, 332.9, 333.3, 532; 526/232.5

(56) References Cited

U.S. PATENT DOCUMENTS

| 5,710,220 A | 1/1998 | Heyman et al. |
| 5,741,851 A | 4/1998 | Heyman et al. |
| 5,919,972 A | 7/1999 | Heyman et al. |
| 6,172,164 B1 | 1/2001 | Davis et al. |

FOREIGN PATENT DOCUMENTS

| EP | 0664306 | 7/1995 |
| EP | 1192198 | 4/2002 |
| WO | WO00/59971 | 10/2000 |

OTHER PUBLICATIONS

PCT International Search Report Dated Mar. 21, 2003.

*Primary Examiner*—James J. Seidleck
*Assistant Examiner*—Olga Asinovsky
(74) *Attorney, Agent, or Firm*—Fernando A. Borrego; Howard & Howard Attorneys, P.C.

(57) ABSTRACT

Disclosed is a process for preparation of final graft polyols via a continuous process. In, addition, a final graft polyol formed by the process is disclosed. The process includes the steps of reacting a plurality of ethylenically unsaturated monomers and a reaction moderator with a macromer having induced unsaturation in the presence of a carrier polyol, a free radical polymerization initiator, and a first graft polyol. The process provides for the preparation of a final graft polyol having a solids level of from 30 to 70% in a continuous process. The final graft polyol produced by the process has a lower viscosity over a range of solids levels, a reduced amount of very large irregularly shaped particles, a reduced viscosity change in response to a change in reaction temperature compared to a typical graft polyol, a reduced tendency to foul the continuous reactor, and a broader particle size distribution compared to an identical graft polyol prepared by a semi-batch process.

54 Claims, 6 Drawing Sheets

GRAFT POLYOLS PREPARED BY A CONTINUOUS PROCESS

RELATED APPLICATIONS

This application claims the benefit of U.S. Provisional Application No. 60/366,706, which was filed Mar. 22, 2002.

STATEMENT REGARDING FEDERALLY SPONSORED RESEARCH

Not applicable.

BACKGROUND OF THE INVENTION

This invention relates generally to graft polyols and, more particularly, to preparation of graft polyols via a continuous process. The process includes the use of a minor amount of a pre-existing first graft polyol during formation of a final graft polyol.

Methods for the formation of graft polyols, also known as polymer polyols, are known in the art and typically involve the reaction of monomers with a macromer in the presence of a carrier polyol, a reaction moderator, and a free radical polymerization initiator wherein the monomers copolymerize with the macromer. One of the difficulties associated with current processes for preparing graft polyols is that the reactors tend to accumulate fouling, which is a particularly significant problem for continuous reactors. This fouling causes the reactors to quickly become plugged with sediment of unstable compounds in the reaction. Thus, one is required to shut down and clean the reactor leading to a loss in productivity of the reactor. Thus, it would be highly advantageous to create a continuous process for the formation of graft polyols having a reduced tendency for fouling.

SUMMARY OF THE INVENTION

In general terms, this invention provides a method of forming a graft polyol and a graft polyol formed by the method using a continuous process.

In one embodiment the invention comprises a continuous method for formation of a final graft polyol comprising the steps of: providing a first reaction stream comprising a first graft polyol having a vinyl polymer content of from 3 to 20 weight percent, a carrier polyol, a macromer having induced unsaturation, and at least one free radical polymerization initiator; providing a second reaction stream comprising at least two ethylenically unsaturated monomers and a reaction moderator; and combining the first reaction stream with the second reaction stream in a continuous reactor thereby continuously forming a final graft polyol having a solids level of from 30 to 70 weight percent.

In a second embodiment, the invention comprises a final graft polyol made by a continuous process and having a solids level of from 30 to 70 weight percent, the second graft polyol comprising the reaction product of at least two ethylenically unsaturated monomers, a reaction moderator, and a macromer having induced unsaturation in the presence of a carrier polyol, a first graft polyol having a vinyl polymer content of from 3 to 20 weight percent, and at least one free radical polymerization initiator.

In another embodiment, the invention comprises a continuous method for formation of a final graft polyol comprising the step of: reacting a first graft polyol having a vinyl polymer content of from 3 to 20 weight percent, a carrier polyol, a macromer having induced unsaturation, and at least one free radical polymerization initiator with at least two ethylenically unsaturated monomers and a reaction moderator in a continuous reactor thereby continuously forming a final graft polyol having a solids level of from 30 to 70 weight percent.

These and other features and advantages of this invention will become more apparent to those skilled in the art from the detailed description of a preferred embodiment. The drawings that accompany the detailed description are described below.

DETAILED DESCRIPTION OF A PREFERRED EMBODIMENT

Figure 1:
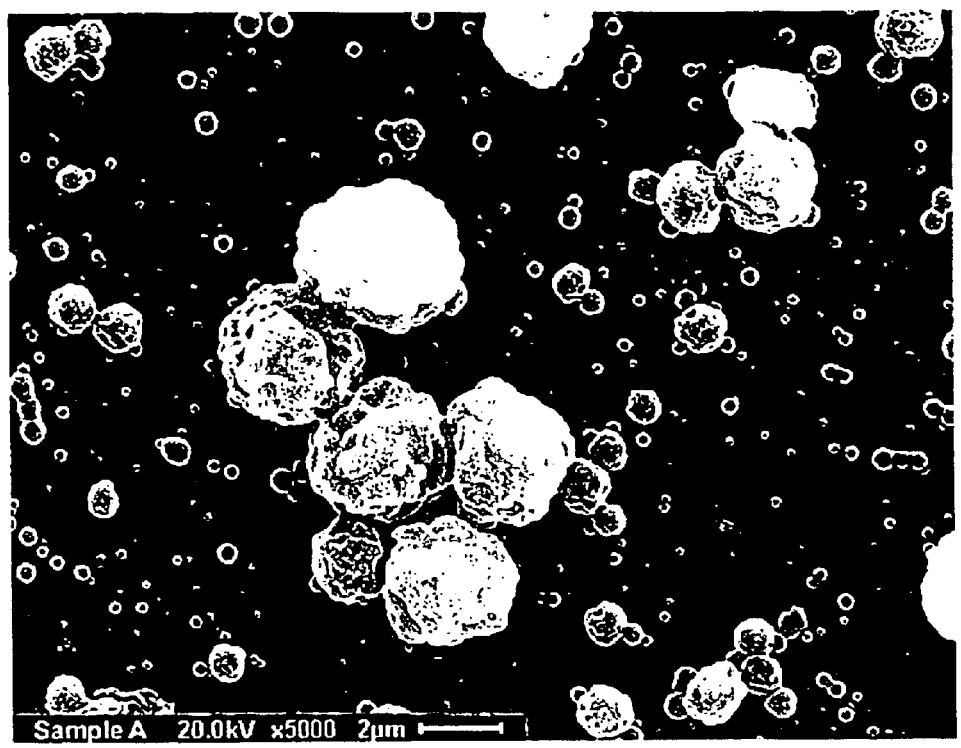
FIG. 1 is a scanning electron microscope photomicrograph of a comparative graft polyol not prepared by the method of the present invention.

The present invention is a method for the formation of a final graft polyol having a solids level of from 30 to 70 weight percent comprising reacting in a carrier polyol at least two ethylenically unsaturated monomers with a macromer having induced unsaturation in the presence of a first graft polyol, at least one free radical polymerization initiator, and a reaction moderator. Each of these components is more fully described below.

Methods of forming conventional polyether polyols are well known, for example, by the base catalyzed addition of alkylene oxides to an initiator molecule or nucleus containing reactive hydrogens such as a polyhydric alcohol. Examples of such polyhydric alcohol initiators include: glycerol, 1,1,1-trimethylolpropane, 1,1,1-trimethylolethane, 1,2,6-hexanetriol, pentaerythritol, sucrose, and sorbitol. Other suitable initiators include both aliphatics and aromatics, such as, ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol. Also included within the term "polyhydric alcohol" are compounds derived from phenol such as 2,2-bis(4-hydroxyphenyl)propane, commonly known as Bisphenol A. Other suitable initiators for the polyether polyols of the present invention comprise hydrogenated starch hydrolysates, such as those available from Roquette under the tradename Lycasin®, which are derivatives of maltitol. The polyether polyols may be prepared by any known process such as, for example, the process disclosed by Wurtz in 1859, *Encyclopedia of Chemical Technology*, Vol. 7, pp. 257–262, published by Interscience Publishers, Inc. (1951) or in U.S. Pat. No. 1,922,459.

Examples of useful alkylene oxides include ethylene oxide, propylene oxide, butylene oxide, amylene oxide, tetrahydrofurans, epihalohydrins, arylalkylene styrene, and mixtures thereof. The alkylene oxides are added onto the initiator molecule and chain propagation is carried out in the presence of catalysts by either anionic polymerization or by cationic polymerization.

The preferred alkoxylation catalysts are potassium hydroxide, sodium hydroxide, alcoholates of potassium hydroxide, alcoholates of sodium hydroxide, cesium hydroxide, amines, Lewis acid catalysts, or double metal complex catalysts, all of which are known in the art.

Graft polyols are generally defined as vinyl polymer dispersions in polyether polyols as disclosed generally in U.S. Reissue Number Re. 33,291. Methods for the formation of typical graft polyols are known in the art. In the prior art graft polyols are typically prepared by the in situ polymerization of a polyether polyol having induced unsaturation, commonly known as a macromer, and an ethylenically unsaturated monomer or a mixture of ethylenically unsaturated monomers in the presence of a carrier polyol, a reaction moderator, and a free radical polymerization initiator.

Generally, the macromers have induced unsaturation levels of between 0.1 to 1.0 mole per mole of polyol. In the present specification and claims the term macromer means a polyether polyol having induced unsaturation. The macromers employed in preparing the typical graft polyols and the first graft polyol and final graft polyol according to the present invention may be prepared by the reaction of any conventional polyol, described above, with an organic compound having both ethylenic unsaturation and a carboxyl, anhydride, isocyanate, epoxy group, or other group reactive with an active hydrogen-containing group. Suitable unsaturated isocyanates include compounds such as isocyanatoethylmethacrylate (IEM) and 1,1-dimethyl metaisopropenyl benzyl isocyanate (TMI). Preferably the macromer used to form the final graft polyol according to the present invention has a number average molecular weight of 6000 Daltons or greater. Also the macromer preferably has a functionality of three or greater.

Representatives of such organic compounds having ethylenic unsaturation and a reactive group include: maleic acid and anhydride, fumaric acid, crotonic acid and anhydride, propenyl succinic anhydride, acrylic acid, acryloyl chloride, hydroxyethyl acrylate or methacrylate, hydroxypropyl acrylate or methacrylate, halogenated maleic acids and anhydrides, unsaturated polyhydric alcohols such as 2-butene-1,4-diol, glycerol allyl ether, trimethylolpropane allyl ether, pentaerythritol allyl ether, pentaerythritol vinyl ether, pentaerythritol diallyl ether, and 1-butene-3,4-diol, unsaturated epoxides such as 1-vinylcyclohexene-3,4, epoxide, butadiene monoxide, vinylglycidyl ether (1-vinyloxy-2,3-epoxy propane), glycidyl methacrylate and 3-allyloxypropylene oxide (allyl glycidyl ether). If a polycarboxylic acid or anhydride is employed to incorporate unsaturation into the polyols, it is preferable to react the unsaturated polyol with an alkylene oxide, preferably ethylene or propylene oxide, to remove the unreacted acid groups prior to employment as a macromer in the present invention. The amount of alkylene oxide employed is such as to reduce the acid number of the unsaturated polyol to about 5 or less.

Representative ethylenically unsaturated monomers which may be employed in preparing the first or final graft polyols of the present invention include: butadiene, isoprene, 1,4-pentadiene, 1,6-hexadiene, 1,7-octadiene, styrene, alpha-methylstyrene, 2-methylstyrene, 3-methylstyrene, 4-methylstyrene, 2,4-dimethylstyrene, ethylstyrene, isopropylstyrene, butylstyrene, phenylstyrene, cyclohexylstyrene, benzylstyrene, and the like; substituted styrenes such as cyanostyrene, nitrostyrene, N,N-dimethylaminostyrene, acetoxystyrene, methyl 4-vinylbenzoate, phenoxystyrene, p-vinylphenyl oxide, and the like; the acrylic and substituted acrylic monomers such as acrylonitrile, acrylic acid, methacrylic acid, methylacryl acrylate, 2-hydroxyethyl acrylate, methyl methacrylate, cyclohexyl methacrylate, benzyl methacrylate, isopropyl methacrylate, octyl methacrylate, methacrylonitrile, ethyl alpha-ethoxyacrylate, methyl alpha-acetaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacryloyl formamide, and the like; the vinyl esters, vinyl ethers, vinyl ketones, etc., such as vinyl acetate, vinyl butyrate, isopropenyl acetate, vinyl formate, vinyl acrylate, vinyl methacrylate, vinylmethoxyacetate, vinyl benzoate, vinyl toluene, vinylnaphthalene, vinyl methyl ether, vinyl propyl ethers, vinyl butyl ethers, vinyl 2-ethylhexyl ether, vinylphenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl methyl ketone, vinylethyl ketone, vinyl phosphonates such as vinyl phenyl ketone, vinyl ethyl sulfone, N-methyl-N-vinyl acetamide, N-vinylpyrrolidone, vinyl imidazole, divinyl sulfoxide, divinyl sulfone, sodium vinylsulfonate, methyl vinylsulfonate, N-vinyl pyrrole and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, and the like.

Any of the known polymerizable ethylenically unsaturated monomers can be used and the compounds listed above are illustrative and not restrictive of the monomers suitable for use in this invention. In a preferred embodiment of the present invention, the monomer comprises acrylonitrile, styrene, and mixtures thereof. Preferably the mixture comprises from 20 to 80% acrylonitrile with the remainder comprising styrene.

The amount of ethylenically unsaturated monomers employed in the final graft polymerization reaction is generally from 30 to 70%, based on the total weight of the product. Preferably from 30 to 50 percent by weight monomers.

Free radical polymerization initiators that may be used include the well-known free radical polymerization initiators such as the peroxides, persulfates, perborates, percarbonates, azo compounds, etc. These include hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alpha-cumyl peroxide, dipropyl peroxide, diisopropyl peroxide, isopropyl-t-butyl peroxide, butyl-t-butyl peroxide, difuroyl peroxide, bis (triphenylmethyl) peroxide, bis(p-methoxybenzoyl)

peroxide, p-monomethoxybenzoyl peroxide, rubene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-decalin hydroperoxide, alpha-methylbenzyl hydroperoxide, alpha-methyl-alpha-ethyl benzyl hydroperoxide, tetralin hydroperoxide, triphenylmethyl hydroperoxide, diphenylmethyl hydroperoxide, alpha, alpha'-azobis-(2-methylheptonitrile), 1,1'-azobis(cyclohexane carbonitrile), 4,4' azobis-(4-cyanopentanoic acid), 2,2'-azobis (isobutyronitrile), 1-t-butylazo-1-cyanocyclohexane, persuccinic acid, diisopropyl peroxydicarbonate, 4,4'-azobis(2,4-dimethylvaleronitrile), 2-t-butylazo-2-cyano-4-methoxy-4-methylpentane, 2,2'-azobis-2-methylbutanenitrile, 2-t-butylazo-2-cyanobutane, 1-t-amylazo-1-cyanocyclohexane, 2,2'-azobis(2,4-dimethyl-4-methoxyvaleronitrile), 2,2'-azobis-2-methylbutyronitrile,2-t-butylazo-2-cyano-4-methylpentane, 2-t-buylazo-2-isobutyronitrile, 2-butylperoxyisopropyl carbonate, 1,1-tertiary-amylperoxy cyclohexane, tertiary-amylperoxy-2-ethylhexanoate, and the like; a mixture of initiators may also be used. In a preferred embodiment of the present invention a mixture of 1,1-tertiary-amylperoxy cyclohexane and tertiary-amylperoxy-2-ethylhexanoate is used as the initiator.

Generally the graft polymerization reaction for formation of the first graft polyol will employ from about 0.1 weight percent to about 10.0 weight percent of a free radical polymerization initiator based on the total weight of the monomers utilized. The graft polymerization reaction for formation of the final graft polyol will generally employ from about 0.1 to about 3.0 weight percent and more preferably from 0.3 to 1.0 weight percent of a free radical polymerization initiator based on the total weight of the monomers utilized.

The present invention also requires the presence of a reaction moderator during formation of the final graft polyol, use of a reaction moderator during formation of the first graft polyol is optional. The reaction moderator is preferably an alcohol, mercaptan, a haloalkane, or mixtures thereof. Among the reaction moderators which may be employed are the following: acetic acid, bromoacetic acid, chloroacetic acid, ethyl dibromoacetate, iodoacetic acid, tribromoacetic acid, ethyl tribromoacetate, trichloroacetic acid, ethyl trichloroacetate, acetone, p-bromophenylacetonitrile, p-nitrophenylacetylene, allyl alcohol, 2,4,6-trinitroaniline, p-ethynylanisole, 2,4,6-trinitroanisole, azobenzene, benzaldehyde, p-cyanobenzaldehyde, 2-butylbenzene, bromobenzene, 1,3,5-trinitrobenzene, benzochrysene, ethyl trinitrobenzoate, benzoin, benzonitrile, benzopyrene, tributylborane, 1,4-butanediol, 3,4-epoxy-2-methyl-1-butene, t-butyl ether, t-butyl isocyanate, 1-phenylbutyne, p-cresol, p-bromocumene, dibenzonaphthacene, p-dioxane, pentaphenyl ethane, ethanol, 1,1-diphenylethylene, ethylene glycol, ethyl ether, fluorene, N,N-dimethylformamide, 2-heptene, 2-hexene, isobutylraldehyde, diethyl bromomalonate, bromotrichloromethane, dibromoethane, diiodomethane, naphthalene, 1-naphthol, 2-napthol, methyl oleate, 2,4,4-triphenyl-1-pentene, 4-methyl-2-pentene, 2,6-diisopropylphenol, phenyl ether, phenylphosphine, diethylphosphine, dibutylphosphine, phosphorus trichloride, 1,1,1-tribromopropane, dialkyl phthalate, 1,2-propanediol, 3-phosphinopropionitrile, 1-propanol, pyrocatechol, pyrogallol, 1,4-benzoquinone, methyl stearate, tetraethylsilane, triethylsilane, dibromostilbene, alpha-bromostyrene, alpha-methylstyrene, tetraphenyl succinonitrile, 2,4,6-trinitrotoluene, p-toluidine, N,N-dimethyl-p-toluidine, alpha-cyano-p-tolunitrile, alpha, alpha'-dibromo-p-xylene, 2,6-xylenol, diethyl zinc, dithiodiacetic acid, ethyl dithiodiacetic acid, 4,4'-dithio-bisanthranilic acid, benzenethiol, o-ethoxybenzenethiol, 2,2'-dithiodiacetic acid, 4,4'-dithio-bisanthranilic acid, benzenethiol, o-ethoxybenzenethiol, 2,2'-dithiobisbenzothiazole, benzyl sulfide, 1-dodecanethiol, ethanethiol, 1-hexanethiol, 1-napthalenethiol, 2-naphthalenethiol, 1-octanethiol, 1-heptanethiol, 2-octanethiol, 1-tetradecanethiol, benzyl thiol, isopropanol, 2-butanol, carbon tetrabromide, bromotrichloromethane, tertiary-dodecylmercaptan, and any combination of the above compounds. Preferred reaction moderators are 2-propanol, 2-butanol, and mixtures thereof. The amount of reaction moderator that is employed preferably ranges from 0.5 to 25 weight percent, based on the total weight of the monomers.

The carrier polyol used to form either the first graft polyol or the final graft polyol according to the present invention may comprise any conventional polyol described above including those made using as an initiator a hydrogenated starch hydrolysate. The carrier polyol used in the formation of the first graft polyol and the final graft polyol need not be the same, however, they can be the same. The carrier polyol may comprise initiator plus propylene oxide with an ethylene oxide cap of from 0 to 30 percent by weight. Alternatively, the carrier polyol can comprise an initiator plus a heteric mixture of alkylene oxides with or without an ethylene oxide or propylene oxide cap. The characteristics of the desired carrier polyol are in part determined by the desired properties of the foam to be prepared using the final graft polyol.

The procedure according to the present invention has as a first step the preparation of a first graft polyol. The first graft polyol is prepared in typical fashion by the reaction of a monomer or mixture of monomers with a macromer having induced unsaturation in the presence of a carrier polyol, a free radical polymerization initiator and optionally, a reaction moderator. The reaction preferably is performed in a batch reactor in a batch or a semi-batch process to generate a first graft polyol generally having a vinyl polymer content of from 3 to 20 weight percent and a fairly narrow and uniform particle size distribution. More preferably the vinyl polymer content of the first graft polyol is from 3 to 15 weight percent and most preferably from 5 to 10 weight percent. The vinyl polymer content is a calculated value determined by dividing the total weight of the ethylenically unsaturated monomers used in the formation reaction for the first graft polyol by the total weight of the product produced, namely the first graft polyol, and then multiplying the result by 100. The carrier polyol, macromer, reaction moderator, and free radical polymerization initiator have been described above. The polymerization reaction is generally carried out at temperatures between 25° C. and 180° C. and more preferably at a temperature of from 90 to 135° C. Preferably the monomers used are a mixture of styrene and acrylonitrile in amounts of from 20 to 80 percent by weight acrylonitrile with the remainder being styrene. Generally the reactor is initially charged with the macromer and a portion of the carrier polyol. Generally, the amount of macromer used ranges from 50 to 500% by weight based on the total weight of the monomers used. More preferably the amount of macromer ranges from 100 to 300% by weight and most preferably from 150 to 250% by weight based on the total weight of the monomers used in the reaction. Then the reactor is heated to the reaction temperature and a first stream containing additional carrier polyol and the free radical initiator is combined with a second stream comprising the monomers and the combined streams are fed into the reactor. The product is generally vacuum stripped and can be stabilized by the addition of compounds such as di-t-butyl-p-cresol (BHT).

In the second step of the procedure a continuous reactor is utilized to form the final graft polyol. The final graft polyol preferably has a solids level of from 30 to 70 weight percent, more preferably from 30 to 50 weight percent, and most preferably from 40 to 50 weight percent. The reactor may initially be charged with either the heel of previously prepared final graft polyol, or macromer plus a portion of the carrier polyol. Then a first reaction stream comprising the first graft polyol, described above, the carrier polyol, a macromer with induced unsaturation, and at least one free radical polymerization initiator is formed and fed continuously into the reactor. Preferably the first graft polyol is present in an amount of from 1 to 20 weight percent, more preferably from 3 to 15 weight percent, and most preferably from 5 to 10 weight percent, based on the total weight of the monomers. Preferably the macromer is present in an amount of from 2 to 10 weight percent and more preferably from 2 to 8 weight percent, based on the total weight of the monomers. The macromer preferably has from 0.1 to 1.0 mole of induced unsaturation and more preferably from 0.2 to 0.8 mole of induced unsaturation per mole of macromer. A second reaction stream comprising the monomers and reaction moderator is formed and fed continuously into the reactor. The continuous reactor is generally run at temperatures between 25° C. and 180° C. and more preferably at a temperature of from 90 to 150° C. The final graft polyol product is continuously collected. The collected product is generally vacuum stripped and may be stabilized by the addition of known stabilizing agents. Specific examples of the procedure and a comparative example are presented below. As would be understood by one of ordinary skill in the art the procedure is capable of many modifications. In another embodiment, the two reaction streams are mixed together prior to entry into the continuous reactor. Also, each reaction stream can comprise any mixture of the reaction components, for example, the first reaction stream could contain monomer or reaction moderator in addition to the other components. Likewise the second reaction stream can include the first graft polyol, the macromer, carrier polyol, free radical initiator, or any mixture thereof.

Macromer A

Macromer A is formed by the reaction of maleic anhydride with a glycerine-initiated polyol comprising a heteric portion having 20 weight percent ethylene oxide, based on the total weight of the polyol, and a 5 weight percent ethylene oxide cap, also based on the total weight of the polyol, as generally described above. The remainder of the macromer comprises glycerine initiator and propylene oxide. The macromer contains approximately 0.4 moles of induced unsaturation per mole of the macromer. The polyol used to form the macromer has a number average theoretical molecular weight of approximately 5,500 Daltons and a hydroxyl number of 25. The initial reaction product is isomerized to form the fumarate derivative and capped with propylene oxide, as is known in the art and disclosed in U.S. Reissue Patent Number Re. 33,291, which is a reissue of U.S. Pat. No. 4,454,255 and is hereby incorporated by reference.

Macromer B

Macromer B is a TMI modified glycerine-initiated polyol. The glycerine-initiated polyol has a 21 weight percent ethylene oxide cap, based on the total weight, with the remainder comprising glycerine initiator and propylene oxide. The polyol has a theoretical number average molecular weight of approximately 6,120 and a hydroxyl number of 27.5. Approximately 0.3 mole of TMI is added per mole of macromer. The reaction is carried out in the presence of dibutyltin dilaurate. The reaction is stopped by the addition of benzoyl chloride.

Polyol A

Polyol A is a glycerine-initiated polyol having an approximately 18.5 weight percent ethylene oxide cap, based on the total weight, and a hydroxyl number of 35.

Polyol B

Polyol B is a trimethylolpropane-initiated polyol having a 13 weight percent ethylene oxide cap, based on the total weight, and a hydroxyl number of 35.

Preparation of a First Graft Polyol According to the Present Invention

As discussed above, the first graft polyol used according to the present invention is generally prepared to have a vinyl polymer content of from 3 to 20 weight percent, as determined by the amount of monomers used in the reaction. Varying the amount of monomer utilized varies the vinyl polymer content of the first graft polyol as is known in the art. Below is presented an example that results in a graft polyol having approximately 8 weight percent vinyl polymer content. The reaction is carried out in a one liter jacketed batch reactor under a nitrogen atmosphere. The reaction temperature is 125° C. and includes stirring at a rate of approximately 300 rpm. The reactor is initially charged with 96.0 grams of macromer B and 356 grams of polyol A. The reactor is fed a first stream comprising 24 grams of acrylonitrile and 24 grams of styrene. The reactor is additionally fed a second stream comprising 100 grams of polyol A and 3 grams of tertiary-amylperoxy-2-ethylhexanoate. The monomer stream is fed in over a time period of 50 minutes and the polyol A containing stream is fed in over a period of approximately 60 minutes. The streams are added through a static mixer and the reaction time is approximately 30 minutes. After 30 minutes of reaction the mixture is vacuum stripped for 30 minutes at about 1 mm Hg. The resultant first graft polyol is stabilized with 0.05 weight percent BHT.

Preparation of a Comparative Final Graft Polyol by a Continuous Process Not According to the Present Invention Utilizing a continuous reactor a comparative final graft polyol is prepared. The percent solids desired in the final graft polyol is determined by the amount of monomers utilized in the reaction and thus varying the amount will result in a product having varying levels of solids. A specific example of a comparative final graft polyol is presented below.

The continuous reactor is initially charged with 300 grams of the desired final graft polyol. The reaction temperature is 135° C. with a stirring rate of approximately 1,500 rpm. The continuous reactor has a volume of approximately 300 milliliters. A first reaction stream comprises 3,034 grams of polyol B, 127 grams of macromer A, 9 grams of 1,1 tertiary-amylperoxy cyclohexane and 5 grams of tertiary-amylperoxy-2-ethylhexanoate. A second reaction stream comprises 940 grams of acrylonitrile, 1,880 grams of styrene, and 423 grams of 2-butanol. The two reaction streams are fed into the continuous reactor through a static mixer and product is continuously produced and withdrawn. The first 180 minutes of product is collected and discarded, the last 20 minutes of product is collected and vacuum stripped for 30 minutes at 125° C. at a pressure of approximately 1 mm Hg. The comparative final graft polyol has a viscosity at 25° C. of approximately 12,800 mPa-s.

Preparation of a Final Graft Polyol by a Continuous Process According to the Present Invention The final graft polyol according to the present invention is prepared as described above for the comparative final graft polyol with the exception that the amount of polyol B in the first stream is reduced to 2,835 grams and 199 grams of the first graft polyol, prepared as described above, is added to the first reaction stream. This provides an amount of approximately 7% by weight of first graft polyol based on the weight of monomers. The reaction conditions are identical to those described above for the comparative final graft polyol. As discussed with respect to the comparative final graft polyol, the final solids content can be varied as known by those of ordinary skill in the art.

Using the present method to form the final graft polyol the fouling of the continuous reactor system was reduced by half, meaning the reaction could be run for at least twice as long a period before requiring shut down for cleaning of the continuous reactor system.

Preparation of a Comparative Final Graft Polyol by a Semi-Batch Process Not According to the Present Invention The reaction is carried out in a 500 milliliter stainless steel pressurized semi-batch reactor under a nitrogen atmosphere. The reaction temperature is 135° C. and includes stirring at a rate of approximately 300 rpm. The reactor is initially charged with 9.5 grams of macromer A, 15.0 grams of the first graft polyol prepared as described above, 32.0 grams of 2-butanol, 96.0 grams of polyol B, and heated to the reaction temperature. The reactor is fed a first stream comprising 70.0 grams of acrylonitrile and 140.0 grams of styrene. The reactor is additionally fed a second stream comprising 120.0 grams of polyol B, 0.4 grams of tertiary-amylperoxy-2-ethylhexanoate, and 0.7 grams of 1,1 tertiary-amylperoxy cyclohexane. The monomer stream is fed in over a time period of 180 minutes and the polyol B containing stream is fed in over a period of approximately 190 minutes. The streams are added through a static mixer and the reaction is continued for 30 minutes after completion of the addition of the two streams. After the additional 30 minutes of reaction the mixture is vacuum stripped for 30 minutes at 125° C. and about 1 mm Hg. This comparative final graft polyol is prepared in a subtantially identical manner to the final graft polyol of the present invention, keeping the ratio of reactants substantially the same and varying only the reaction type. The product has a viscosity at 25° C. of approximately 20,700 mPa-s, which is far above that of the final graft polyol prepared according to the present invention as shown in the figures described below.

Figure 2:
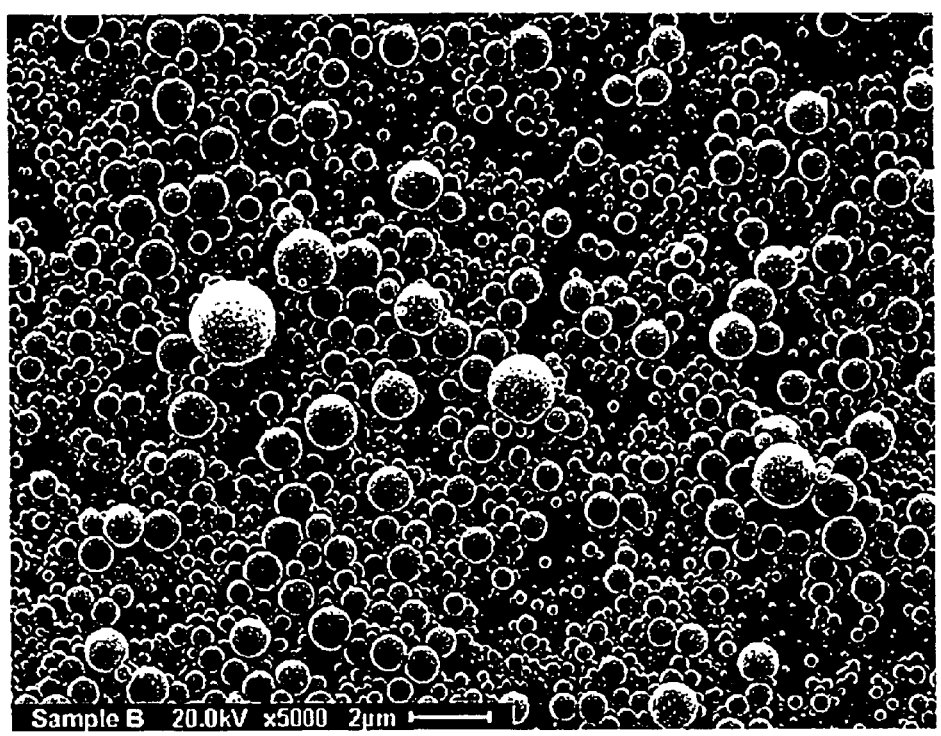
FIG. 2 is a scanning electron microscope photomicrograph of a final graft polyol prepared by the method of the present invention.

FIG. 1 is a scanning electron microscope photomicrograph of a comparative graft polyol prepared as described above. One can see that the particles are very irregularly shaped and that very large irregularly shaped particles are produced in addition to smaller particles. By way of contrast, FIG. 2 is a scanning electron microscope photomicrograph of a final graft polyol prepared according to the present invention as described above. The particles have a very uniform, spherical outer shape and the particle size distribution appears narrower than the comparative graft polyol made by the continuous process. The final graft polyol prepared according to the present invention does not contain the very large irregularly shaped particles shown in FIG. 1. The very large particles shown in FIG. 1 are believed to be responsible for fouling of the continuous reactor thus requiring shut down of the continuous reactor for cleaning.

Figure 3:
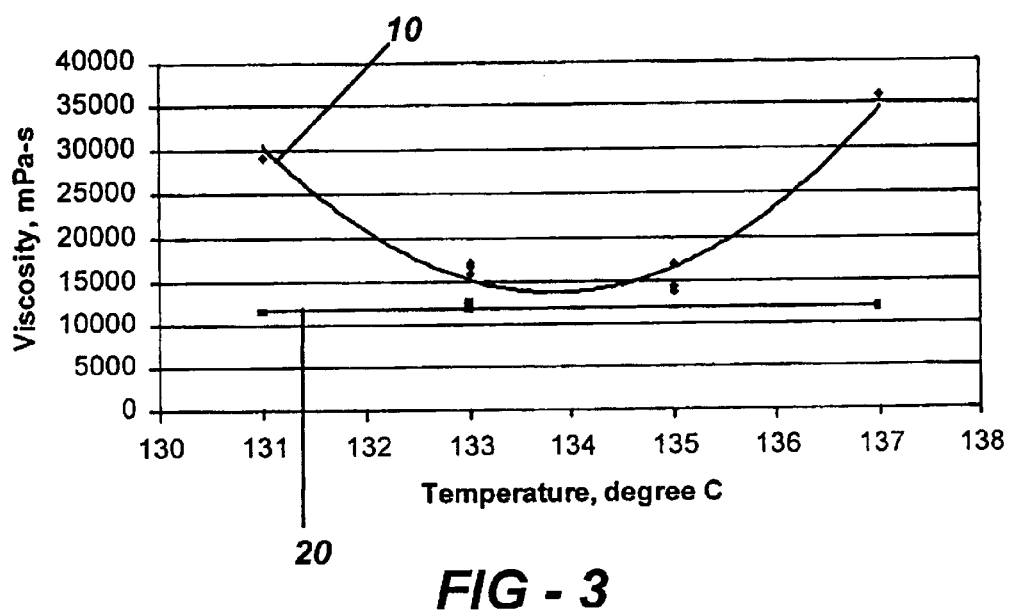
FIG. 3 is a graph comparing the effect of reaction temperature on the viscosity of a comparative graft polyol not prepared by the method of the present invention versus the effect of reaction temperature on the viscosity of a final graft polyol prepared by the method of the present invention.

In FIG. 3 the effect of reaction temperature on the viscosity of the comparative final graft polyol is shown at 10. The comparative final graft polyol is extremely sensitive to the reaction temperature and its viscosity ranges from approximately 30,000 mPa-s to 14,000 mPa-s over a reaction temperature change of only 3° C. from 131° C. to 134° C. By way of contrast, the viscosity of the final graft polyol prepared according to the present invention, shown at 20 in FIG. 3, is unaffected by a change in reaction temperature over the range of 131° C. to 137° C. and it has a constant and much lower viscosity of approximately 12,000 mPa-s.

Figure 4:
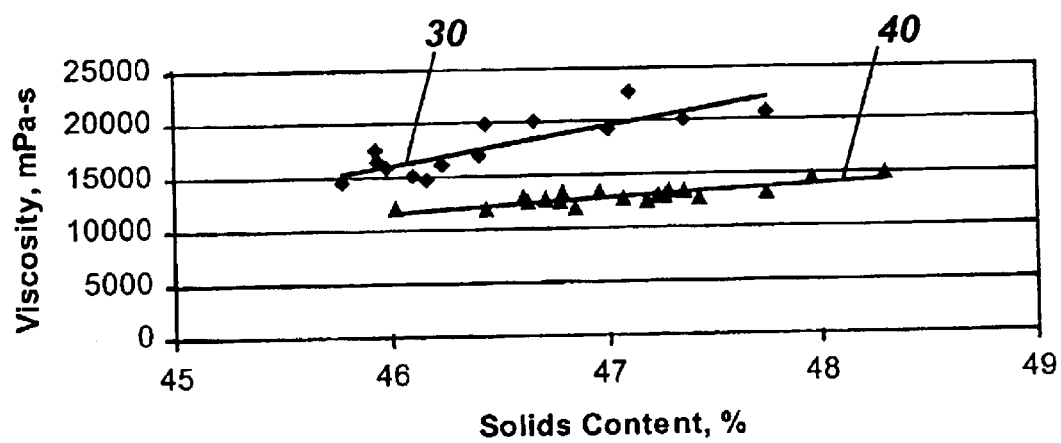
FIG. 4 is a graph comparing the effect of solids level on the viscosity of a comparative graft polyol not prepared by the method of the present invention versus the effect of solids level on the viscosity of a final graft polyol prepared by the method of the present invention.

In FIG. 4 the effect of solids content on the final product viscosity is shown for the comparative final graft polyol at 30 and for a final graft polyol prepared according to the present invention at 40. The final graft polyol prepared according to the present invention always has a much lower viscosity, lower by an amount of approximately 3,000 mPa-s.

Figure 5:
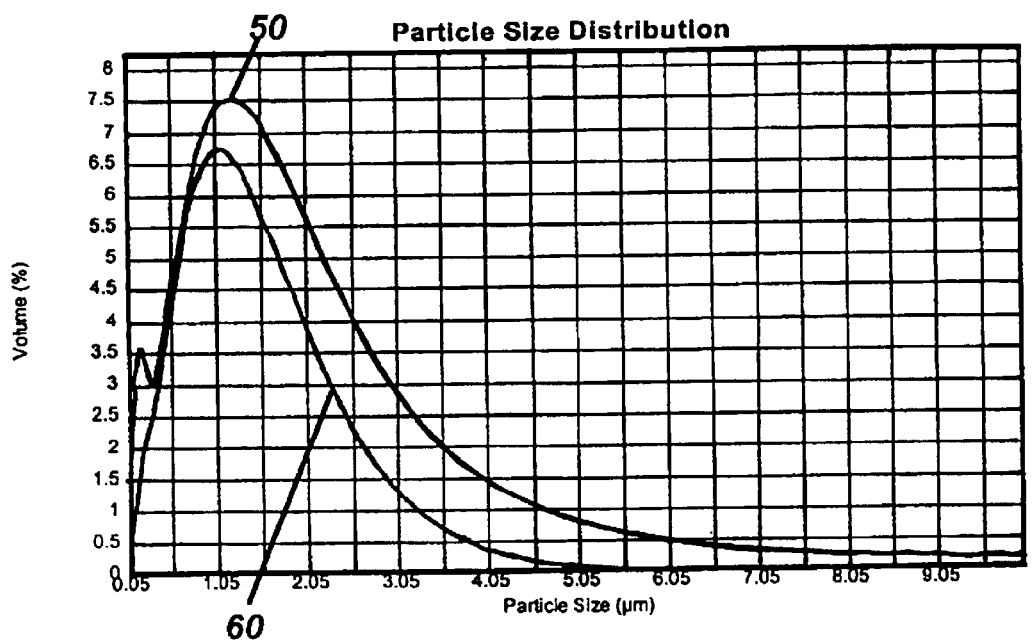
FIG. 5 is a graph comparing the particle size distribution of a final graft polyol prepared by a continuous process according to the present invention versus the particle size distribution of a graft polyol prepared by a continuous process not according to the present invention.

In FIG. 5 the particle size distribution of the comparative final graft polyol, prepared as described above, is shown at 50. The particle size distribution of the final graft polyol prepared according to the present invention, and described above, is shown at 60. The shape of the two curves is similar, however, the final graft polyol according to the present invention at 60 has a somewhat narrower size distribution with a similar peak value of approximately 1.05 microns.

Figure 6:
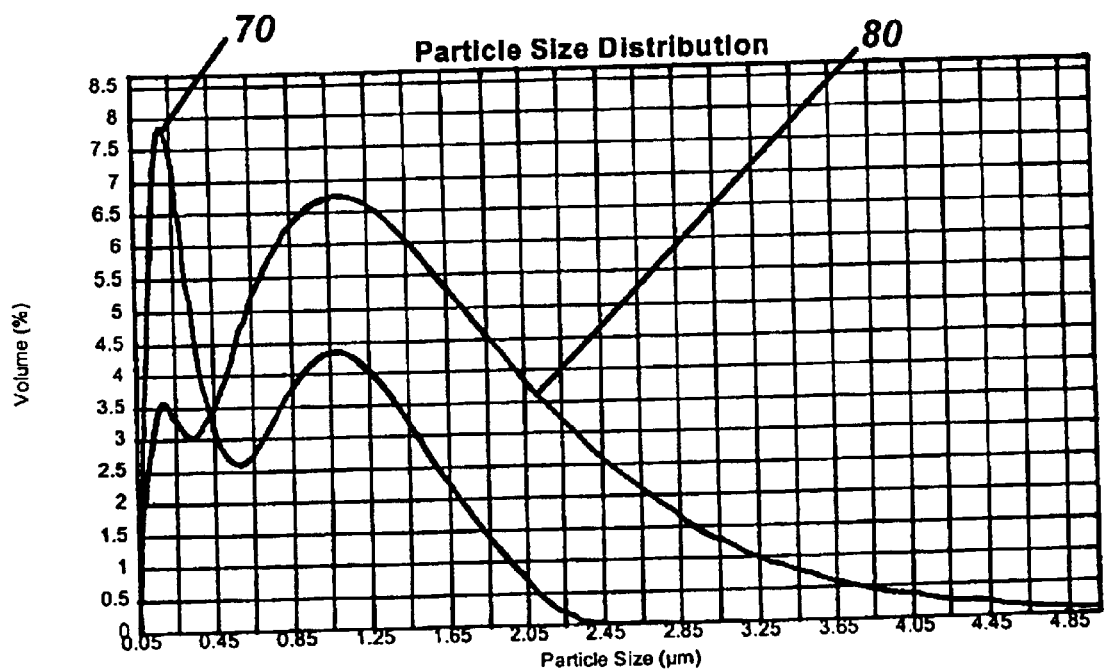
FIG. 6 is a graph comparing the particle size distribution of a final graft polyol prepared by a continuous process according to the present invention versus the particle size distribution of a graft polyol prepared by a semi-batch process not according to the present invention.

In FIG. 6 the particle size distribution of a comparative final graft polyol prepared in a semi-batch process is shown at 70. For comparison the particle size distribution of the final graft polyol prepared according to the present invention is shown at 80 in FIG. 6. The size distribution is much larger for the final graft polyol prepared according to the present invention. The comparative final graft polyol prepared by the semi-batch process at 70 has its major peak below approximately 0.25 microns with a second peak at approximately 1.05 microns. The comparative final graft polyol at 70 has virtually no particles larger than approximately 2.45 microns. By way of contrast the final graft polyol according to the present invention at 80 has its minor peak below approximately 0.25 microns with its major peak at approximately 1.05 microns and a significant number of particles larger than approximately 2.45 microns.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A continuous method for formation of a final graft polyol comprising the steps of:
   a) providing a first reaction stream comprising a first graft polyol having a vinyl polymer content of from 3 to 20 weight percent, a carrier polyol, a macromer having induced unsaturation, and at least one free radical polymerization initiator;
   b) providing a second reaction stream comprising at least two ethylenically unsaturated monomers and a reaction moderator; and
   c) combining the first reaction stream with the second reaction stream in a continuous reactor and continuously forming a final graft polyol having a solids level of from 30 to 70 weight percent.

2. The method as recited in claim 1, wherein step a) comprises providing the first graft polyol at a level of from 1 to 20 weight percent based on the total weight of the at least two ethylenically unsaturated monomers.

3. The method as recited in claim 1, wherein the first reaction stream comprises a mixture of at least two free radical polymerization initiators.

4. The method as recited in claim 3, comprising providing a mixture of 1,1-tertiary-amylperoxy cyclohexane and tertiary-amylperoxy-2-ethylhexanoate as the at least two free radical polymerization initiators.

5. The method as recited in claim 1, wherein the final graft polyol has a solids level of from 30 to 50 percent by weight.

6. The method as recited in claim 1, where step a) comprises providing a macromer that is at least one of a fumurate-modified, a maleic acid-modified, a maleic anhydride-modified, or a 1,1-dimethyl meta-isopropenyl benzyl isocyante-modified polyol.

7. The method as recited in claim 1, comprising providing a macromer having an induced unsaturation level of from 0.1 to 1.0 mole of unsaturation per mole of macromer.

8. The method as recited in claim 1, comprising the further step of forming the macromer by reacting a hydrogenated starch hydrolysate-initiated polyol with an organic compound having both ethylenic unsaturation and a group that is reactive with an active hydrogen-containing group.

9. The method as recited in claim 1, comprising providing a macromer having a number average molecular weight of at least 6,000 Daltons.

10. The method as recited in claim 1, comprising providing a macromer having a functionality of at least three.

11. The method as recited in claim 1, comprising providing the macromer in an amount of from 2 to 10 weight percent based on the total weight of the monomers.

12. The method as recited in claim 1, wherein step b) comprises providing a mixture of acrylonitrile and styrene as the at least two ethylenically unsaturated monomers.

13. The method as recited in claim 12, where in step b) the acrylonitrile comprises from 20 to 80 weight percent of the mixture of ethylenically unsaturated monomers and styrene comprises the remainder of the monomer.

14. The method as recited in claim 1, wherein step b) comprises providing the reaction moderator in an amount of from 0.5 to 25 weight percent based on the total weight of the monomers.

15. The method as recited in claim 1, wherein step b) comprises providing 2-butanol, isopropanol, or a mixture thereof as the reaction moderator.

16. The method as recited in claim 1, further comprising the step of reacting at least two ethylenically unsaturated monomers, a carrier polyol, at least one free radical polymerization initiator, and a macromer having induced unsaturation to form the first graft polyol.

17. The method as recited in claim 16, comprising forming the first graft polyol in a batch type reactor.

18. The method as recited in claim 16, comprising providing a macromer that is at least one of a fumurate-modified, a maleic acid-modified, a maleic anhydride-modified, or a 1,1-dimethyl meta-isopropenyl benzyl isocyanate-modified polyol to form the first graft polyol.

19. The method as recited in claim 16, comprising providing the macromer having induced unsaturation used to form the first graft polyol at a level of from 50 to 500% by weight based on the total weight of the monomers used to form the first graft polyol.

20. A final graft polyol made by a continuous process and having a solids level of from 30 to 70 weight percent, said final graft polyol comprising the reaction product of at least two ethylenically unsaturated monomers, a reaction moderator, and a macromer having induced unsaturation in the presence of a carrier polyol, a first graft polyol having a vinyl polymer content of from 3 to 20 weight percent, and at least one free radical polymerization initiator.

21. A graft polyol as recited in claim 20, wherein said at least two ethylenically unsaturated monomers comprises a mixture of acrylonitrile and styrene.

22. A grail polyol as recited in claim 21, wherein said acrylonitrile comprises from 20 to 80 weight percent of said mixture of acrylonitrile and stryrene and said styrene comprises the remainder.

23. A graft polyol as recited in claim 20, wherein said first graft polyol is present in an amount of from 1 to 20 weight percent based on the total weight of the monomers.

24. A graft polyol as recited in claim 20, wherein said macromer used to form said final graft polyol is at least one of a fumurate-modified, a maleic acid-modified, a maleic anhydride-modified, or a 1,1-dimethyl meta-isopropenyl benzyl isocyanate-modified polyol.

25. A graft polyol as recited in claim 20, wherein said macromer has an induced unsaturation level of from 0.1 to 1.0 mole of unsaturation per mole of macromer.

26. A graft polyol as recited in claim 20, wherein said macromer comprises the reaction product of a hydrogenated starch hydrolysate-initiated polyol with an organic compound having both ethylenic unsaturation and a group that is reactive with an active hydrogen-containing group.

27. A graft polyol as recited in claim 20, wherein said macromer has a number average molecular weight of at least 6,000 Daltons.

28. A graft polyol as recited in claim 20, wherein said macromer has a functionality of at least three.

29. A graft polyol as recited in claim 20, wherein said macromer is present in an amount of from 2 to 10 weight percent based on the total weight of the monomers.

30. A graft polyol as recited in claim 20, wherein said reaction moderator is present in an amount of from 0.5 to 25 weight percent based on the total weight of the monomers.

31. A graft polyol as recited in claim 20, wherein said reaction moderator comprises 2-butanol, isopropanol, or a mixture thereof.

32. A graft polyol as recited in claim 20, wherein said at least one free radical polymerization initiator comprises 1,1-tertiary-amylperoxy cyclohexane, tertiary-amylperoxy-2-ethylhexanoate, or mixtures thereof.

33. A graft polyol as recited in claim 20, wherein said first graft polyol comprises the reaction product of at least two ethylenically unsaturated monomers, a carrier polyol, at least one free radical polymerization initiator, and a macromer having induced unsaturation.

34. A graft polyol as recited in claim 33, wherein said first graft polyol is formed in a batch type reactor.

35. A graft polyol as recited in claim 33, wherein said macromer used to form said first graft polyol is at least one of a fumurate-modified, a maleic acid-modified, a maleic anhydride-modified, or a 1,1-dimethyl meta-isopropenyl benzyl isocyante-modified polyol.

36. A continuous method for formation of a final graft polyol comprising the step of:
  reacting a first graft polyol having a vinyl polymer content of from 3 to 20 weight percent, a carrier polyol, a macromer having induced unsaturation, and at least one free radical polymerization initiator with at least two ethylenically unsaturated monomers and a reaction moderator in a continuous reactor and continuously forming a final graft polyol having a solids level of from 30 to 70 weight percent.

37. The method as recited in claim 36, comprising providing the first graft polyol at a level of from 1 to 20 weight percent based on the total weight of the at least two ethylenically unsaturated monomers.

38. The method as recited in claim 36, comprising providing a mixture of at least two free radical polymerization initiators.

39. The method as recited in claim 36, comprising providing a mixture of 1,1-tertiary-amylperoxy cyclohexane and tertiary-amylperoxy-2-ethylhexanoate as the at least two free radical polymerization initiators.

40. The method as recited in claim 36, wherein the final graft polyol has a solids level of from 30 to 50 percent by weight.

41. The method as recited in claim 36, comprising providing a macromer having an induced unsaturation level of from 0.1 to 1.0 mole of unsaturation per mole of macromer.

42. The method as recited in claim 36, comprising the further step of forming the macromer by reacting a hydrogenated starch hydrolysate-initiated polyol with an organic compound having both ethylenic unsaturation and a group that is reactive with an active hydrogen-containing group.

43. The method as recited in claim 36, comprising providing a macromer having a number average molecular weight of at least 6,000 Daltons.

44. The method as recited in claim 36, comprising providing a macromer having a functionality of at least three.

45. The method as recited in claim 36, comprising providing the macromer in an amount of from 2 to 10 weight percent based on the total weight of the monomers.

46. The method as recited in claim 36, comprising providing a mixture of acrylonitrile and styrene as the at least two ethylenically unsaturated monomers.

47. The method as recited in claim 46, wherein the acrylonitrile comprises from 20 to 80 weight percent of the mixture of ethylenically unsaturated monomers and styrene comprises the remainder of the monomer.

48. The method as recited in claim 36, comprising providing the reaction moderator in an amount of from 0.5 to 25 weight percent based on the total weight of the monomers.

49. The method as recited in claim 36, comprising providing 2-butanol, isopropanol, or a mixture thereof as the reaction moderator.

50. The method as recited in claim 36, wherein the macromer is at least one of a fumurate-modified, a maleic acid-modified, a maleic anhydride-modified, or a 1,1-dimethyl meta-isopropenyl benzyl isocyanate-modified polyol.

51. The method as recited in claim 36, comprising the further step of reacting at least two ethylenically unsaturated monomers, a macromer having induced unsaturation, a carrier polyol, and at least one free radical polymerization initiator to form the first graft polyol.

52. The method as recited in claim 51, comprising the further step of forming the first graft polyol in a batch type reactor.

53. The method as recited in claim 51, comprising providing a macromer that is at least one of a fumurate-modified, a maleic acid-modified, a maleic anhydride-modified, or a 1,1-dimethyl meta-isopropenyl benzyl isocyanate-modified polyol to form the first graft polyol.

54. The method as recited in claim 51, comprising providing the macromer having induced unsaturation used to form the first graft polyol at a level of from 50 to 500% by weight based on the total weight of the monomers used to form the first graft polyol.

* * * * *